US006321893B1

(12) United States Patent
Muhlert et al.

(10) Patent No.: US 6,321,893 B1
(45) Date of Patent: Nov. 27, 2001

(54) CLUTCH ACTUATION SYSTEM FOR A VEHICLE

(75) Inventors: Michael K. Muhlert, Fort Worth, TX (US); Dave L. Stoor, Schaumburg, IL (US); Kenneth M. Marko, Corinth, TX (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/494,086

(22) Filed: Jan. 28, 2000

(51) Int. Cl.[7] .............................. F16D 23/12; G05G 1/14

(52) U.S. Cl. .................................... 192/99 S; 192/110 B; 74/512; 74/500.5; 180/315

(58) Field of Search ............................. 192/99 S, 110 B; 74/512, 560, 500.5, 502.4, 502.5, 502.6; 180/315

(56) References Cited

U.S. PATENT DOCUMENTS 4,181,209 * 1/1980 Wheaton .......................... 192/111 A
4,426,890 * 1/1984 Hansen ................................... 74/478

* cited by examiner

*Primary Examiner*—Richard M. Lorence
(74) *Attorney, Agent, or Firm*—Sidley Austin Brown & Wood

(57) ABSTRACT

A clutch actuation system (20) of a vehicle for actuating a clutch lever (22) of a clutch system (24) in response to the actuation of a clutch pedal (26) in a vehicle cab (28). The clutch pedal (26) is attached to a clutch pedal shaft (38). A first bearing member (40) pivotably supports one end of the shaft (38), and a second bearing member (60) pivotably supports the other end. The first bearing member (40) is attached to the inside of the vehicle cab (28). The shaft (38) extends through the second bearing member (60) at a vehicle firewall (50) and through the firewall into the engine compartment when the clutch actuation system (20) is operably installed on the vehicle. A clutch pedal lever (64) is attached to a shaft end within the engine compartment. A clutch return spring (86) biases the clutch pedal (26) via the clutch pedal lever (22) and the shaft (38). A clutch cable firewall bracket (72) is attached to the firewall (50) within the engine compartment and it retains a cable housing end for a clutch cable (66). One end of the cable (66) is connected to the clutch pedal lever (64) and the other end is connected to the clutch lever (22).

28 Claims, 11 Drawing Sheets

CLUTCH ACTUATION SYSTEM FOR A VEHICLE

TECHNICAL FIELD OF THE INVENTION

The present invention relates to a clutch actuation system for a vehicle. In one aspect, it relates to a clutch actuation system having a clutch pedal within a vehicle cab attached to a clutch pedal shaft that projects through a vehicle firewall, as well as a clutch cable and clutch spring linked to the shaft and located outside of the vehicle cab.

BACKGROUND OF THE INVENTION

It is well known to provide a clutch actuation system on vehicles for actuating the clutch of the vehicle in response to the actuation of a clutch pedal in the vehicle cab. Commonly known clutch actuation systems typically have a mechanical linkage mechanism, a clutch cable, a hydraulic system, or some combination thereof to translate the clutch pedal actuation to actuation of the clutch lever on the clutch housing. But, many of these commonly known clutch actuation systems have disadvantages in their design. For example, clutch actuation systems are often difficult to adjust when the adjustment points are located inside the cab under the dash or below the cab next to the transmission because it is difficult to access such adjustment points. Thus, a need exists for a clutch actuation system that has easily accessible adjustment points.

Also, many clutch actuation systems have unprotected linkages or other moving parts that are exposed to the environment in the engine compartment or below the cab. Such exposed parts may require frequent lubrication to prolong the life and maintain the functionality of the clutch actuation system. Hence, there is a need for a clutch actuation system that has sealed components and a limited number of moving parts that are exposed to the environment outside the cab.

Some clutch actuation systems that use linkage mechanisms typically do not provide a modular design that can be used for a variety of different vehicles or a variety of different transmissions. Thus, a need exists for a clutch actuation system that provides a modular design capable of use on a variety of vehicles or with a variety of transmissions.

Clutch actuation systems that use only mechanical linkages often translate vibrations from the transmission to the vehicle cab via the linkages. It is desirable to isolate the vehicle cab from vibrations to provide comfort for the vehicle occupants. Therefore, a need exists for a clutch actuation system that translates little or no vibrations of the transmission to the vehicle cab.

SUMMARY OF THE INVENTION

Many of the needs outlined above are addressed by the present invention hereof. It is an object of the present invention to provide a clutch actuation system for a vehicle that has easily accessible adjustment points.

It is another object of the present invention to provide a clutch actuation system for a vehicle that has sealed components and a limited number of moving parts that are exposed to the environment outside the cab.

It is yet another object of the present invention to provide a clutch actuation system for a vehicle that provides a modular design capable of use on a variety of different vehicles or with a variety of different transmissions.

It is a further object of the present invention to provide a clutch actuation system for a vehicle that reduces vibrations of the transmission translated to the vehicle cab.

In accordance with one aspect of the present invention, a clutch actuation system is provided for actuating a clutch lever of a clutch system in response to the actuation of a clutch pedal in a vehicle cab. The clutch pedal is attached to a clutch pedal shaft. The clutch pedal shaft lies on a first rotational axis. In one possible embodiment the first rotational axis extends laterally relative to the vehicle cab when the clutch actuation system is operably installed on the vehicle. A first bearing member pivotably supports a first shaft end of the clutch pedal shaft such that the shaft can pivot within the first bearing member. The clutch pedal is attached to the shaft proximate to the first bearing member. The first bearing member is attached to the vehicle cab and it is entirely within the vehicle cab when the clutch actuation system is operably installed on the vehicle.

A second bearing member pivotably supports a second shaft end such that the shaft can also pivot within the second bearing member. The second bearing member is adapted to attach to the vehicle firewall such that a portion of the second bearing member is located on one side of the firewall within the vehicle cab and another portion of the second bearing member is located on the other side of the firewall in the engine compartment. The second shaft end extends through the second bearing member and through the firewall into the engine compartment when the clutch actuation system is operably installed on the vehicle.

A clutch pedal lever is attached to the second shaft end such that as the clutch pedal pivots about the first rotational axis, the clutch lever correspondingly pivots about the first rotational axis via the shaft. The clutch pedal lever is located within the engine compartment when the clutch actuation system is operably installed on the vehicle. A clutch cable firewall bracket is adapted to attach to the vehicle within the engine compartment proximate to the clutch pedal lever.

A clutch return spring biases the clutch pedal. The clutch return spring can be located in a many different places while still biasing the clutch pedal. In another possible embodiment, the clutch return spring has a first spring end attached to the clutch pedal lever and a second spring end attached to the clutch cable firewall bracket. Hence, the clutch return spring can bias the clutch pedal via the clutch pedal lever about the shaft, and it can be located within the engine compartment.

A clutch cable is used for pulling the clutch lever. At least a portion of the clutch cable is surrounded by a cable housing. A first cable housing end is attached to the clutch cable firewall bracket. A first cable end is connected to the clutch pedal lever such that the clutch cable moves relative to the cable housing when the clutch pedal lever pivots about the first rotational axis. A second cable end is connected to the clutch lever such that the clutch cable actuates the clutch lever when the clutch pedal lever pivots about the first rotational axis via the shaft in response to the clutch pedal pivoting about the first rotational axis. The clutch cable and cable housing are located entirely outside of the vehicle cab when the clutch actuation system is operably installed on the vehicle. In yet another possible embodiment, adjustment nuts attach the first cable housing end to the clutch cable firewall bracket such that the clutch cable can be adjusted at the clutch cable firewall bracket, which may be easily accessible in engine compartment when the clutch actuation system is operably installed on the vehicle.

In accordance with another aspect of the present invention, a method of installing and adjusting a clutch actuation system for a vehicle is provided. The method comprises fourteen steps. First, a clevis link of the clutch actuation system is threaded onto a second cable end of a clutch cable of the clutch actuation system to a position where about half of the threads on the second cable end are threaded into the clevis link. Second, a clutch stop bracket of the clutch actuation system is installed on a structural member within a cab of the vehicle such that mounting bolts for the clutch stop bracket are loose enough that the clutch stop bracket can still be moved while on the structural member. Third, a clutch stop adjustment tool is inserted into mounting holes designated for a first bearing member of the clutch actuation system. The mounting holes are formed in the structural member. Fourth, the clutch stop bracket is slid along a surface of the structural member while the mounting bolts are still loosely fastened to a position where the clutch stop bracket abuts the clutch stop adjustment tool. Fifth, the mounting bolts are tightened while maintaining the clutch stop bracket against the clutch stop adjustment tool. Sixth, the clutch stop adjustment tool is removed. Seventh, the remainder of the clutch actuation system is operably installed on the vehicle, except for connecting a first cable end of the clutch cable to a clutch pedal lever of the clutch actuation system and except for attaching a first cable housing end of the clutch actuation system to a clutch cable firewall bracket of the clutch actuation system. Eighth, a clutch pedal having a pedal stop extending therefrom of the clutch actuation system is pivoted to provide clearance for insertion of a clutch freepedal adjustment tool between the pedal stop and the clutch stop bracket. Ninth, the clutch freepedal adjustment tool is inserted between the pedal stop and the clutch stop bracket. Tenth, the clutch pedal is released while the clutch freepedal adjustment tool is still inserted between the pedal stop and the clutch stop bracket such that a clutch return spring of the clutch actuation system biases the pedal stop against the clutch freepedal adjustment tool to sandwich the clutch freepedal adjustment tool between the pedal stop and the clutch stop bracket. Eleventh, the first cable end is operably attached to the clutch pedal lever. Twelfth, the first cable housing end is operably attached to the clutch cable firewall bracket using adjustment nuts while removing the slack in the clutch cable. Thirteenth, the clutch freepedal adjustment tool is removed. Fourteen, the adjustment nuts are turned as needed to further adjust the clutch actuation system.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

Figure 1:
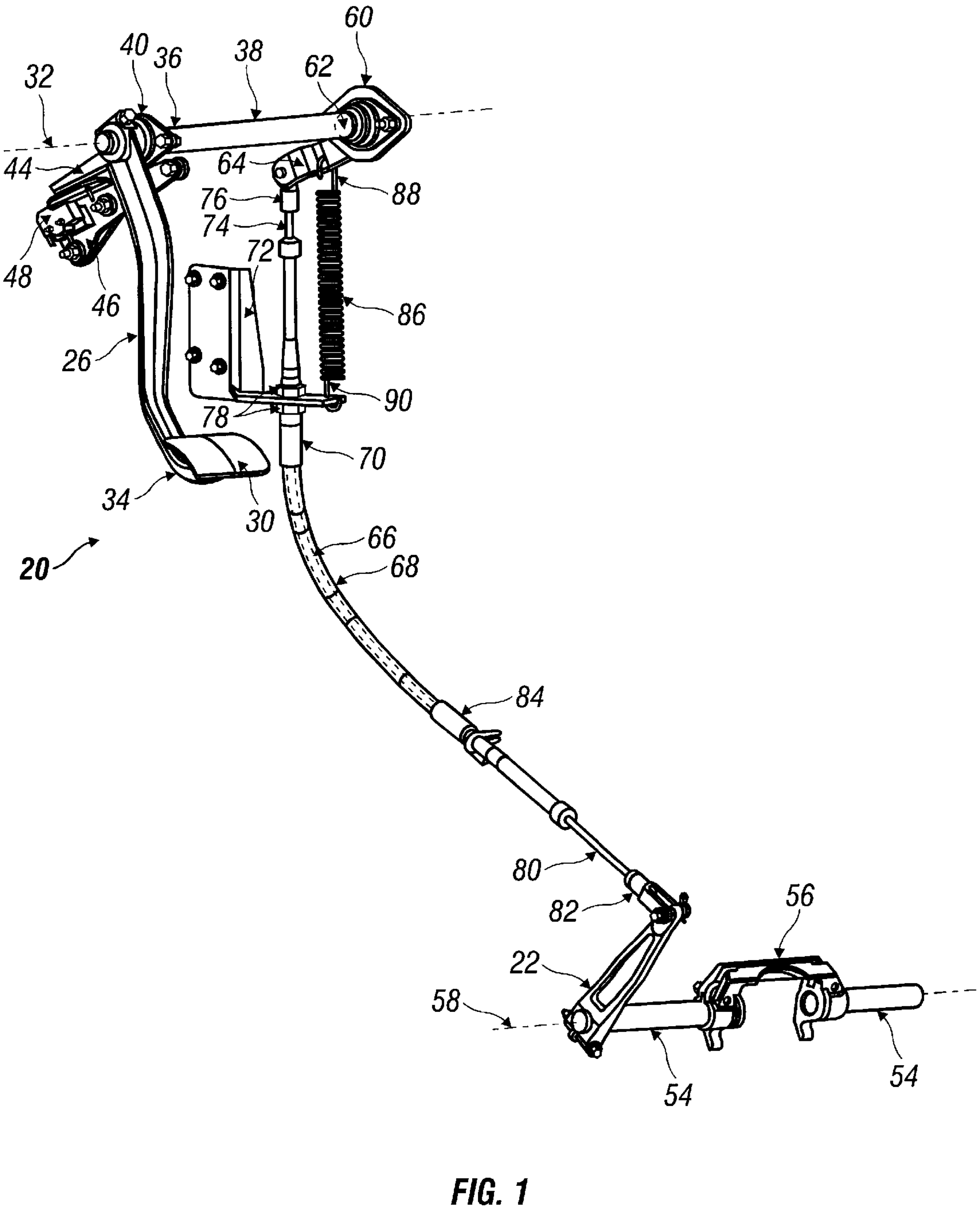
FIG. 1 is a perspective view of a clutch actuation system according to a first embodiment of the present invention.
Figure 2:
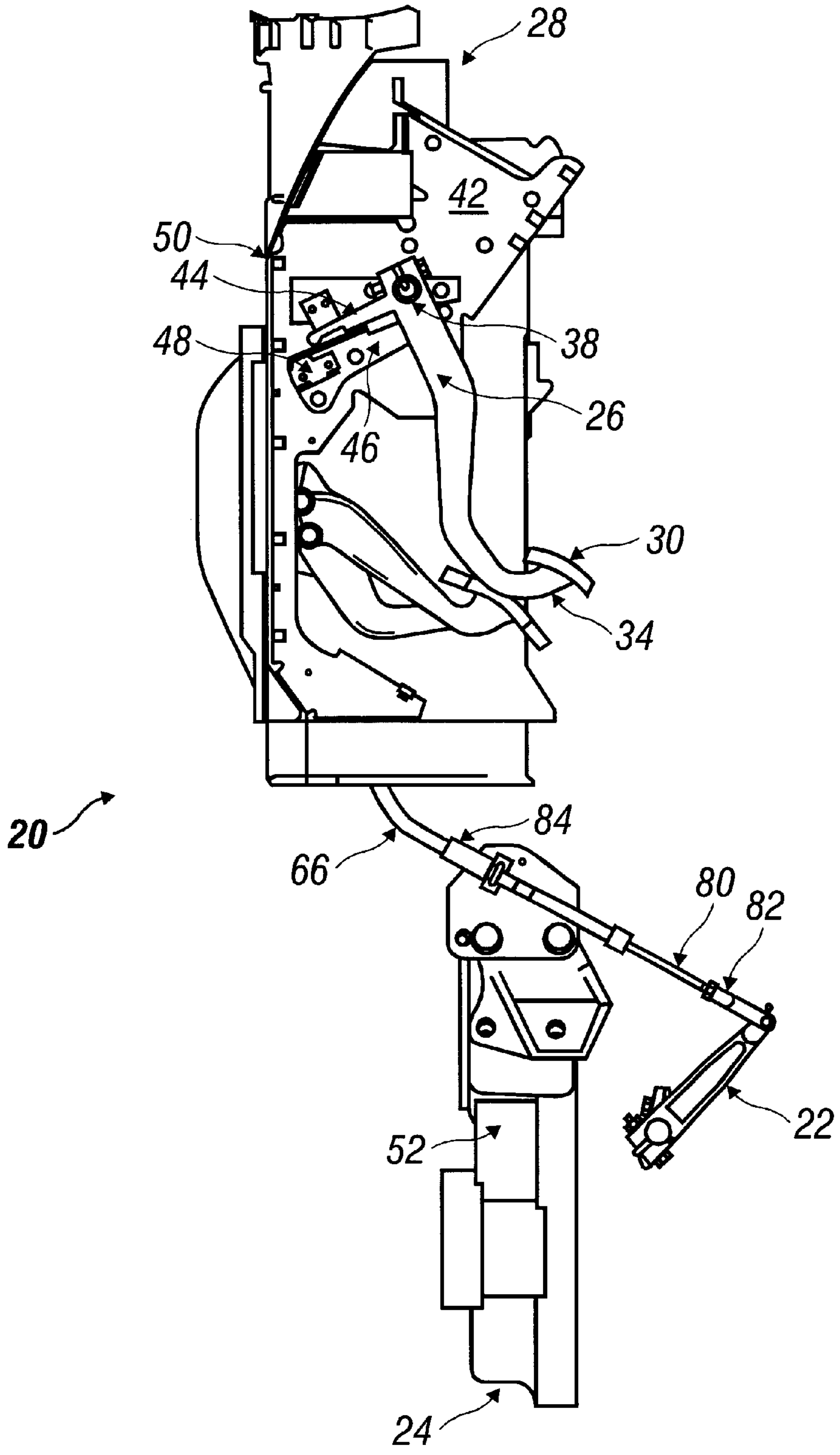
FIG. 2 is a left side view of the clutch actuation system of FIG. 1 operably installed on the vehicle, with portions of the vehicle broken away for illustration purposes.

Referring now to the drawings, wherein like reference numbers are used to designate like elements throughout the various views, a first embodiment as well as other possible embodiments and modifications are further described.

FIGS. 1–7 show various views and various portions of a clutch actuation system 20 according to a first embodiment of the present invention. The primary purpose of the clutch actuation system 20 is to actuate a clutch lever 22 on a given clutch system 24 of a vehicle in response to the actuation of a clutch pedal 26 within a vehicle cab 28 by a vehicle operator. The clutch pedal 26 in the first embodiment is a hanging clutch pedal having a foot pad 30 being lower than an axis 32 that the clutch pedal 26 pivots about. The footpad 30 is at a distal end 34 of the clutch pedal 26 and it provides a surface where the operator can ergonomically apply a force to the clutch pedal with a foot to actuate the clutch pedal.

Figure 5:
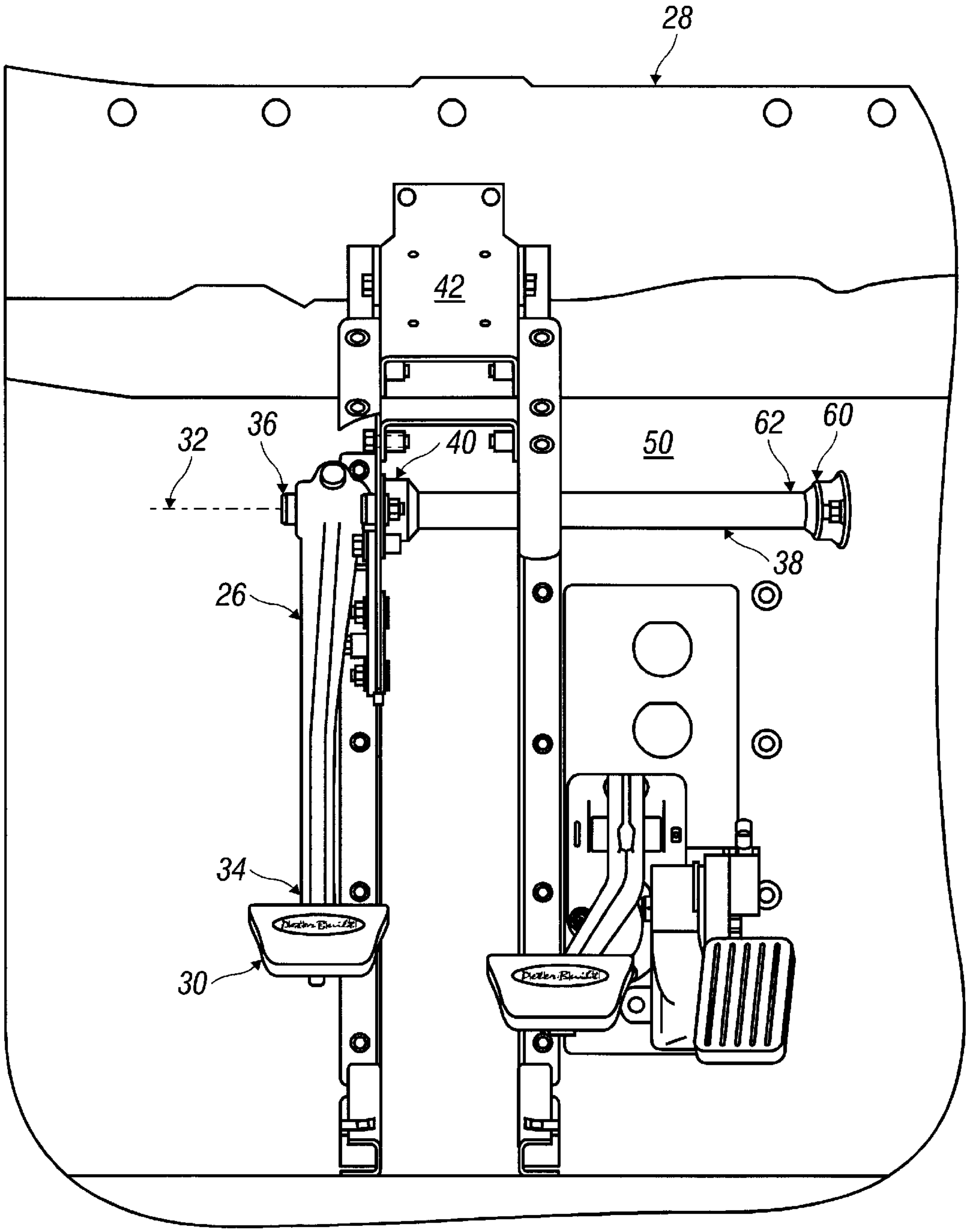
FIG. 5 is an enlarged back view of the clutch actuation system of FIG. 1 operably installed on the vehicle, with portions of the clutch actuation system and the vehicle broken away for illustration purposes.

The clutch pedal 26 is attached to a first shaft end 36 of a clutch pedal shaft 38 such that the clutch pedal remains fixed relative to the shaft during actuation of the clutch pedal. The clutch pedal shaft 38 lies on the first rotational axis 32, which the clutch pedal pivots about during the actuation of the clutch pedal. As best seen in FIG. 5, the first rotational axis 32 extends laterally relative to vehicle cab 28 when the clutch actuation system 20 is operably installed in the vehicle. A first bearing member 40 is attached to a structural member of the vehicle, which in this case is the steering column 42 within the cab 28. The first bearing member 40 supports the first shaft end 36. The clutch pedal 26 is proximate to the first bearing member 40. The shaft 38 pivots within the first bearing member 40 when the clutch pedal 26 is actuated. The first bearing member 40 includes a bearing housing, a bearing, and bolts that fasten the first bearing member on the vehicle.

A pedal stop 44 is attached to the clutch pedal 26 and extends therefrom. In this embodiment, the pedal stop is integrally formed as a part of the clutch pedal. But, the pedal stop 44 can be a separate piece attached to the clutch pedal 26 or the clutch pedal shaft 38. The pedal stop 44 remains fixed relative to the clutch pedal 26 while the clutch pedal is actuated. A clutch stop bracket 46 is adapted to attach to a structural member (e.g., the steering column 42) of the vehicle proximate to the clutch pedal 26, the pedal stop 44, and the first bearing member 40 when the clutch actuation system 20 is operably installed on the vehicle. One purpose of the clutch stop bracket 46 is to limit the pivoting of the clutch pedal 26 about the first rotational axis 32 when the pedal stop 44 abuts the clutch stop bracket 46. Another purpose of the clutch stop bracket 46 is to hold a clutch switch 48, which is attached thereto. The clutch switch 48 is positioned on the clutch stop bracket 46 such that it is switched when the pedal stop 44 abuts the clutch stop bracket 46.

Figure 3:
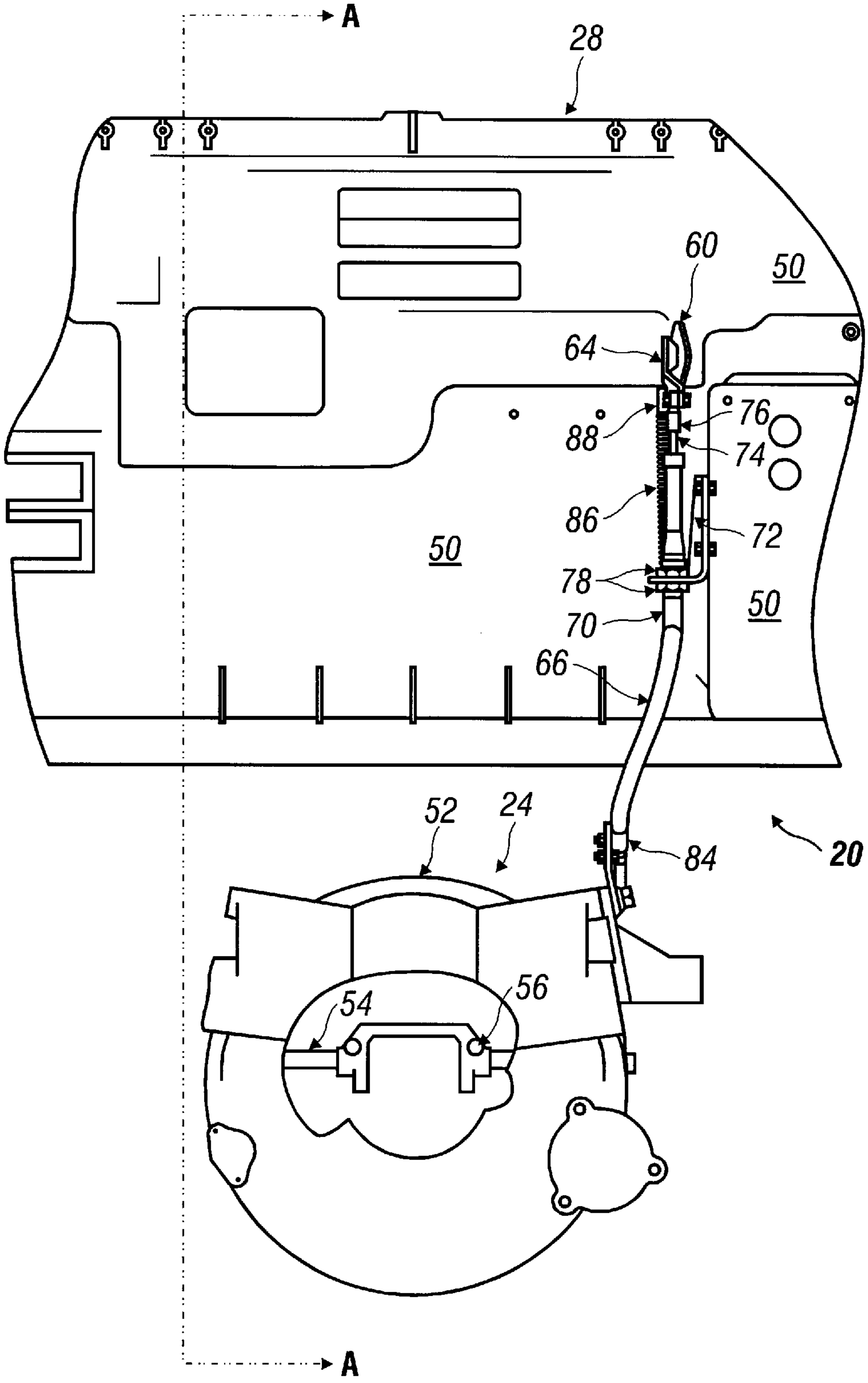
FIG. 3 is a front view of the clutch actuation system of FIG. 1 operably installed on the vehicle, with portions of the vehicle broken away for illustration purposes.
Figure 4:
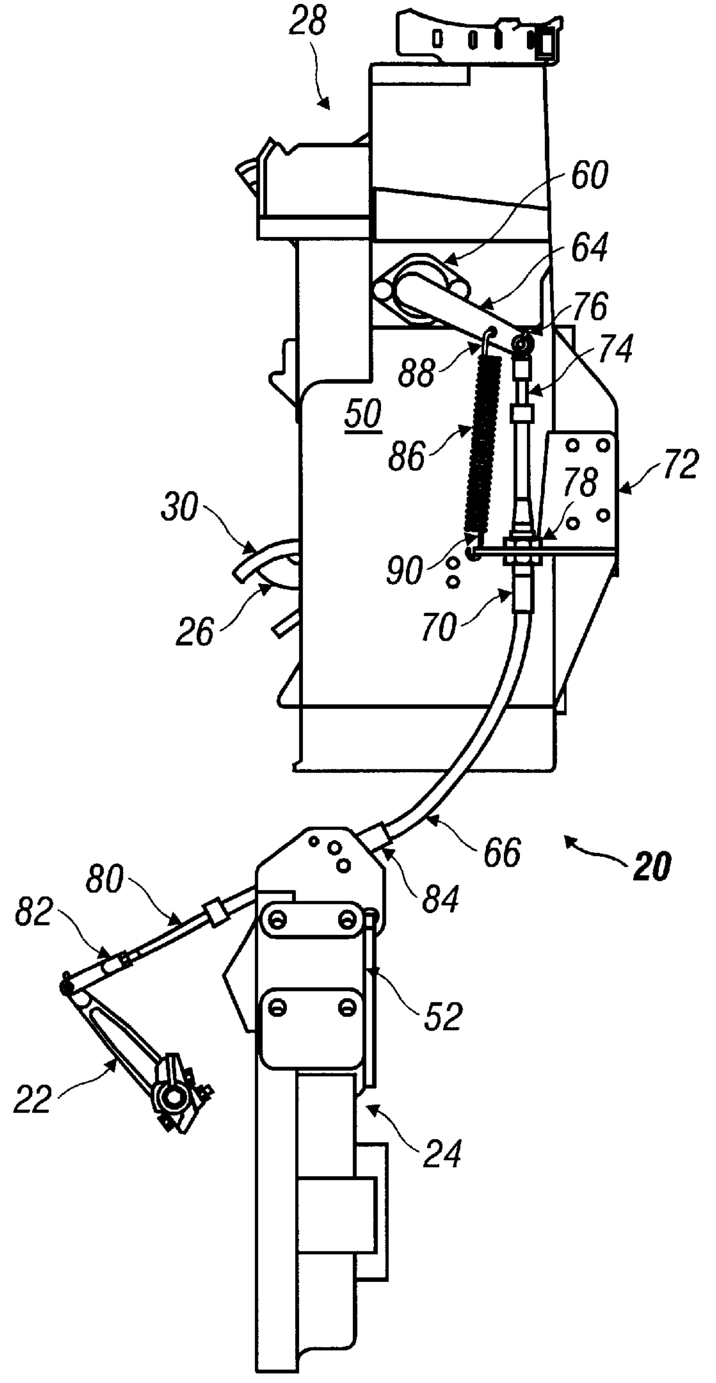
FIG. 4 is a right side view along line A—A of FIG. 1 showing the clutch actuation system operably installed on the vehicle with portions of the vehicle broken away for illustration purposes.

A firewall 50 separates the interior of the cab 28 from an engine compartment, which in this example is at the front of the cab because it is a front-engine vehicle. The engine compartment contains the engine and at least part of the clutch system 24 of the transmission. As best seen in FIG. 3, a typical clutch system 24 has a clutch housing 52 containing, among other things, a clutch (not shown), a clutch spring (not shown), a release shaft 54, and a release yoke 56. The clutch lever 22 is attached to the release shaft 54. The release shaft 54 lies on a second rotational axis 58, which the clutch lever 22 pivots about when it is actuated. Also attached to the release shaft 54 is the release yoke 56. When the clutch lever 22 pivots about the second rotational axis 58, it causes the release shaft 54 to pivot, which in turn causes the release yoke 56 to pivot about the second rotational axis 58. The pivoting of the release yoke 56 actuates the clutch and clutch spring. There are many commonly known clutch systems, all of which may vary from the clutch system 24 discussed here by example.

A second bearing member 60 is adapted to attach to the firewall 50 of the vehicle cab 28. The second bearing member 60 supports a second shaft end 62 of the clutch pedal shaft 38. The clutch pedal shaft 38 extends through the second bearing member 60, and the shaft also pivots within the second bearing member when the clutch pedal 26 is actuated. Because the length of the shaft 38 can be easily varied for a given design, the clutch actuation system 20 has a modular design that can be adapted for use on many different vehicles. A portion of the second bearing member 60 is located on one side of the firewall 50 within the cab 28, and another portion of the second bearing member is located on the other side of the firewall in the engine compartment when the clutch actuation system 20 is operably installed on the vehicle. Hence, a portion of the second shaft end 62 is located within the engine compartment. The second bearing member 60 includes a bearing housing, a bearing, and bolts that fasten the second bearing member on the vehicle.

A clutch pedal lever 64 is attached to the second shaft end 62 of the shaft 38, and it is located within the engine compartment when the clutch actuation system 20 is operably installed on the vehicle. The clutch pedal lever 64 is fixed relative to the shaft 38. Thus, as the clutch pedal 26 pivots about the first rotational axis 32, the clutch pedal lever 64 correspondingly pivots about the first rotational axis via the shaft 38.

A clutch cable 66 connects the clutch pedal lever 64 to the clutch lever 22. A portion of the clutch cable 66 is surround by a cable housing 68, which sheaths and protects the cable. The clutch cable 66 and cable housing 68 are located entirely outside of the cab 28 when the clutch actuation system 20 is operably installed on the vehicle. The clutch cable 66 is a sealed cable having the cable housing ends sealed to retain a lubricating substance (e.g., grease) (not shown) within the cable housing 68 and to prevent environmental elements (e.g., water, dirt, dust) from entering the cable housing. A first cable housing end 70 is attached to a clutch cable firewall bracket 72. The clutch cable firewall bracket 72 is adapted to attach to the firewall 50 in the engine compartment of the vehicle proximate to the clutch pedal lever 64 when the clutch actuation system 20 is operably installed on the vehicle. A first cable end 74 is connected to the clutch pedal lever 64 by an eye hole link 76.

The first cable housing end 70 is attached to the clutch cable firewall bracket 72 by a pair of cable adjustment nuts 78, one on each side of the clutch cable firewall bracket. The first cable housing end 70 is threaded and the cable adjustment nuts 78 have threads that match so that the adjustment nuts can be screwed onto the first cable housing end to capture the clutch cable bracket 72. A second cable end 80 is connected to the clutch lever 22 by a clevis link 82, which is threaded onto the second cable end. A second cable housing end 84 is attached to the clutch housing 52 of the vehicle. The cable housing ends 70, 84 remain fixed relative to the vehicle cab 28 and firewall 50, and the clutch cable 66 moves relative to the cable housing 68 when the clutch pedal lever 64 pivots. Therefore, when the clutch pedal 26 is actuated and it pivots about the first rotational axis 32, the clutch pedal lever 64 also pivots about the first rotational axis, which thus causes the clutch pedal lever to pull the first cable end 74. When pulled, the clutch cable 66 moves relative to the cable housing 68, which in turn causes the clutch lever 22 to be pulled by the cable at the second cable end 80. Because the connection between the clutch pedal lever 64 and the clutch lever 22 is a cable and the length of the cable 66 can be easily varied for a given design, the clutch actuation system 20 has a modular design that can be adapted for use on many different vehicles or with many different transmission systems.

The clutch pedal lever 64 is oriented so that it is substantially perpendicular to the clutch cable 66 as the clutch pedal 26 is midway through its operable pivot range about the first rotational axis 32 when the clutch actuation system 20 is operably installed on the vehicle. The clutch pedal lever orientation ensures that the first cable end 74 is pulled approximately linearly over the small operable pivot range of the clutch pedal 26, which in this case is about 30°. For the same reason, the clutch lever 22 is also oriented so that it is substantially perpendicular to the clutch cable 66 as the clutch pedal 26 is midway through its operable pivot range about the first rotational axis 32 when the clutch actuation system 20 is operably installed on the vehicle.

A clutch return spring 86 biases the clutch pedal 26 towards a position where the pedal stop 44 abuts the clutch stop bracket 46. A first spring end 88 of the clutch return spring 86 is attached to the clutch pedal lever 64, and a second spring end 90 is attached to the clutch cable firewall bracket 72. Hence, the clutch return spring 86 is located in the engine compartment when the clutch actuation system 20 is operably installed on the vehicle, and the clutch return spring 86 biases the clutch pedal 26 via the clutch pedal lever 64 and the shaft 38.

Other possible embodiments of the present invention may have other variations. For example, the orientation of the clutch pedal shaft 38 relative to the vehicle cab 28 may vary. The clutch return spring 86 can be located inside the cab 28, such as being attached to the pedal stop 44 at the first spring end 88 and attached to the cab at the second spring end 90. The clutch cable 66 may or may not be a sealed cable and may or may not have a lubricant inside the cable housing 68, but a sealed cable with lubricant is preferred for longer cable life and less maintenance. The first cable end 74 may or may not be connected to the clutch pedal lever 64 by the eye hole link 76 because another commonly known link can be substituted. Similarly, the second cable end 80 may or may not be connected to the clutch lever 22 by the clevis link 82 because another commonly known link can be substituted. The second cable housing end 84 may or may not be attached to the vehicle because if the cable housing 68 is rigid and strong enough, then only one portion or end of the cable housing needs to be fixed relative to the vehicle for the cable to function. But, it is preferred to fix both ends 70, 84 of the cable housing 68 to reduce flex in the cable housing because cable housing flex can create play while pulling the cable 66. The clutch actuation system 20 may or may not have a clutch switch 48. Also, the clutch actuation system 20 may or may not have the pedal stop 44 and clutch stop bracket 46 because another component may provide the same result another way (e.g., a stop that the clutch pedal lever 64 could abut against located proximate to the clutch pedal lever). The cable adjustment nuts 78 could be located at the second cable housing end 80 rather than the first cable housing end 74. Also, there could be an embodiment that has no cable adjustment nuts 78 because there can be other possible ways to adjust the clutch pedal 26 (e.g., an adjustable clutch lever 22 or an adjustment of the clutch pedal 26 relative to the shaft 38).

Figure 6:
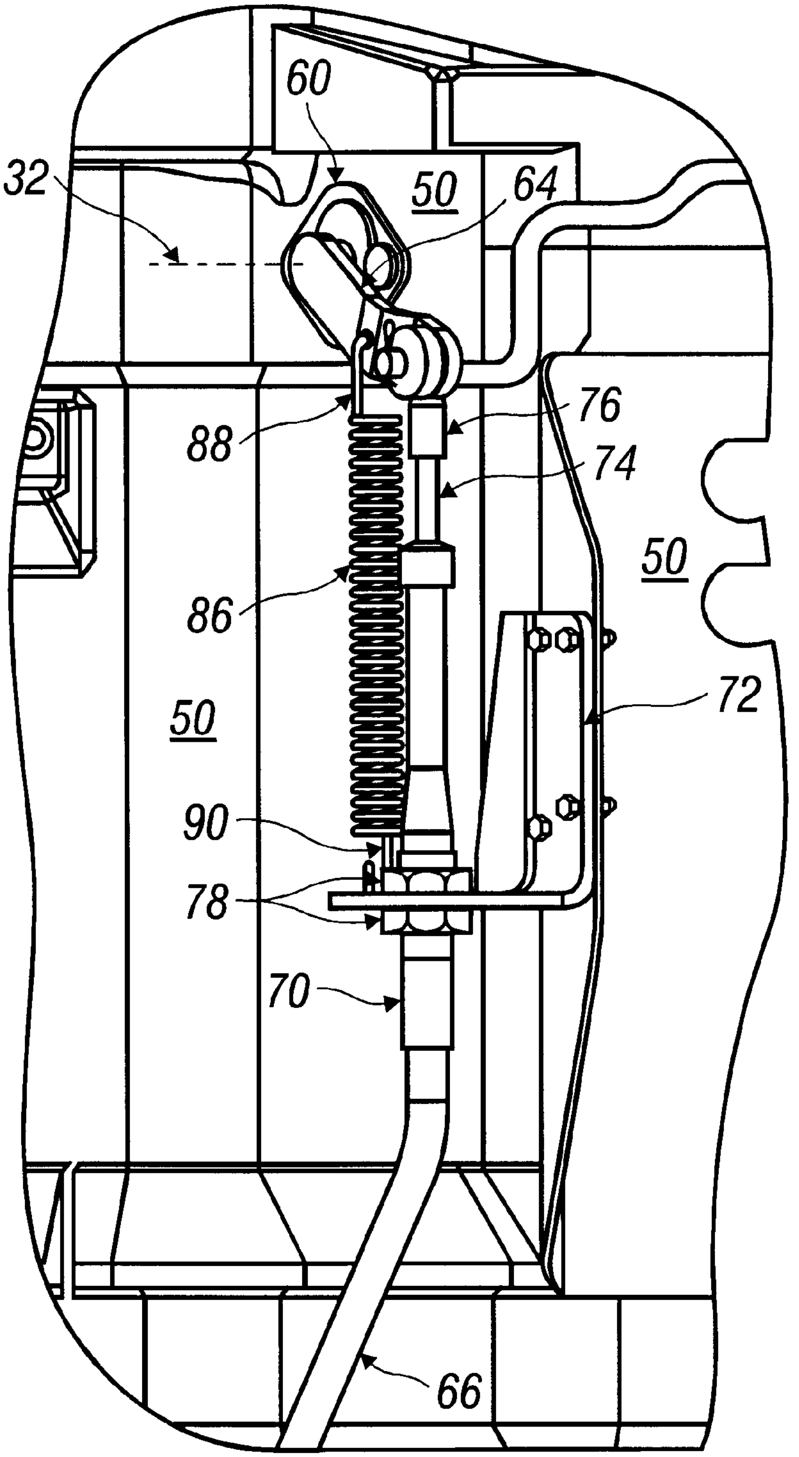
FIG. 6 is an enlarged front view of FIG. 3 with portions of the clutch actuation system and the vehicle broken away for illustration purposes.
Figure 7:
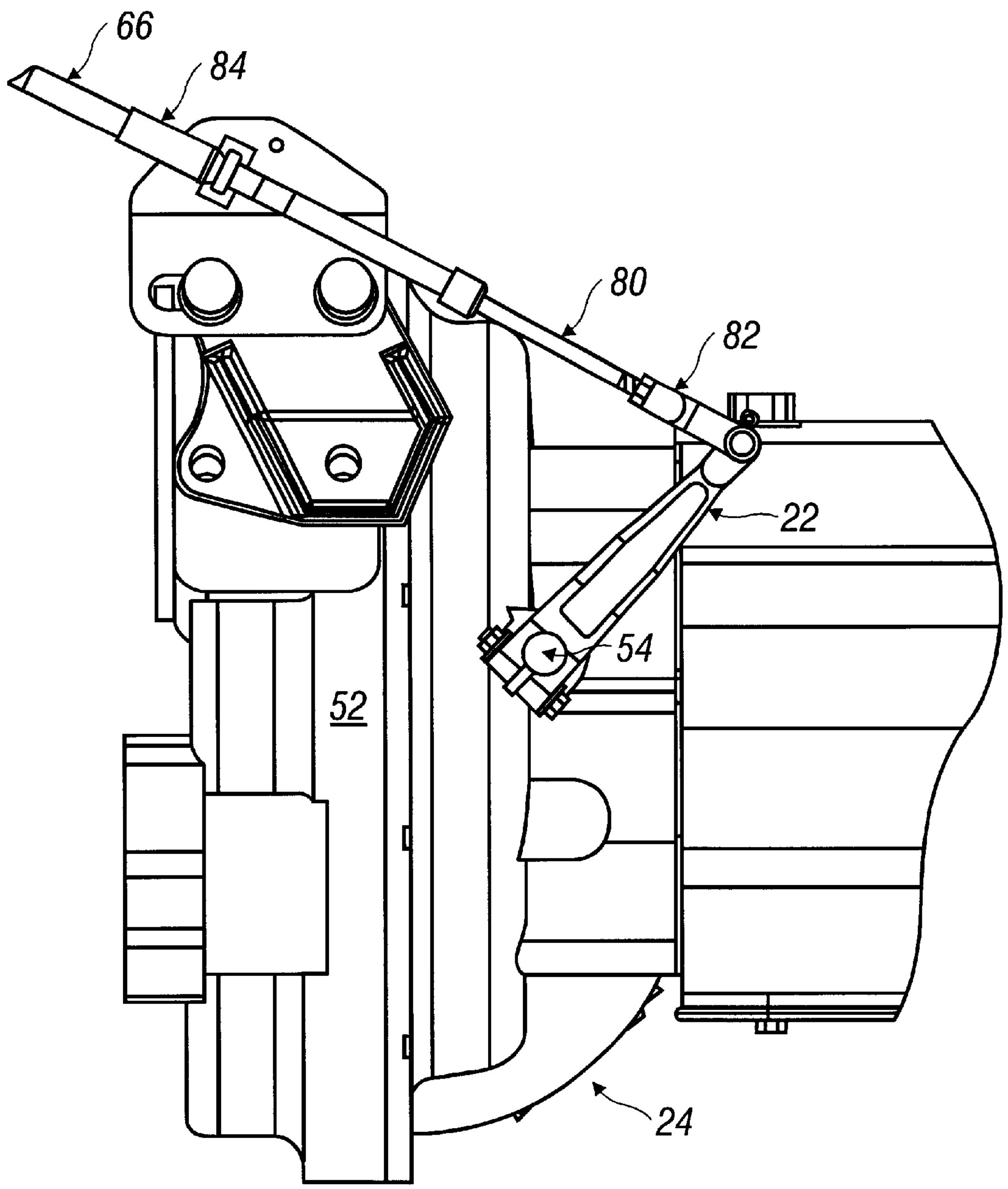
FIG. 7 is an enlarged left side view of FIG. 2 with portions of the clutch actuation system and the vehicle broken away for illustration purposes.
Figure 8:
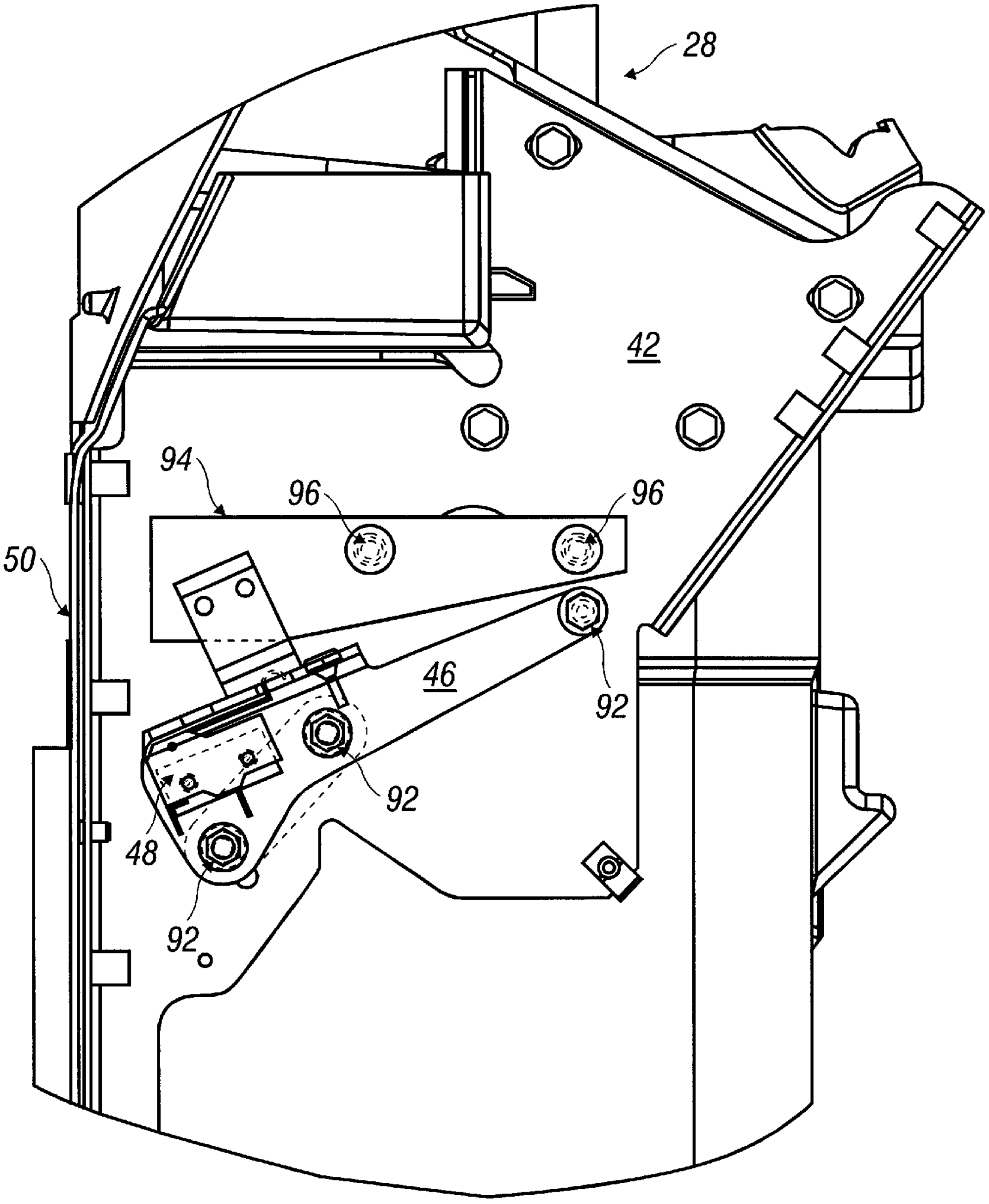
FIG. 8 is an enlarged left side view of the clutch stop bracket installed on a steering column in the vehicle cab, with portions of the clutch actuation system and the vehicle broken away for illustration purposes.
Figure 9:
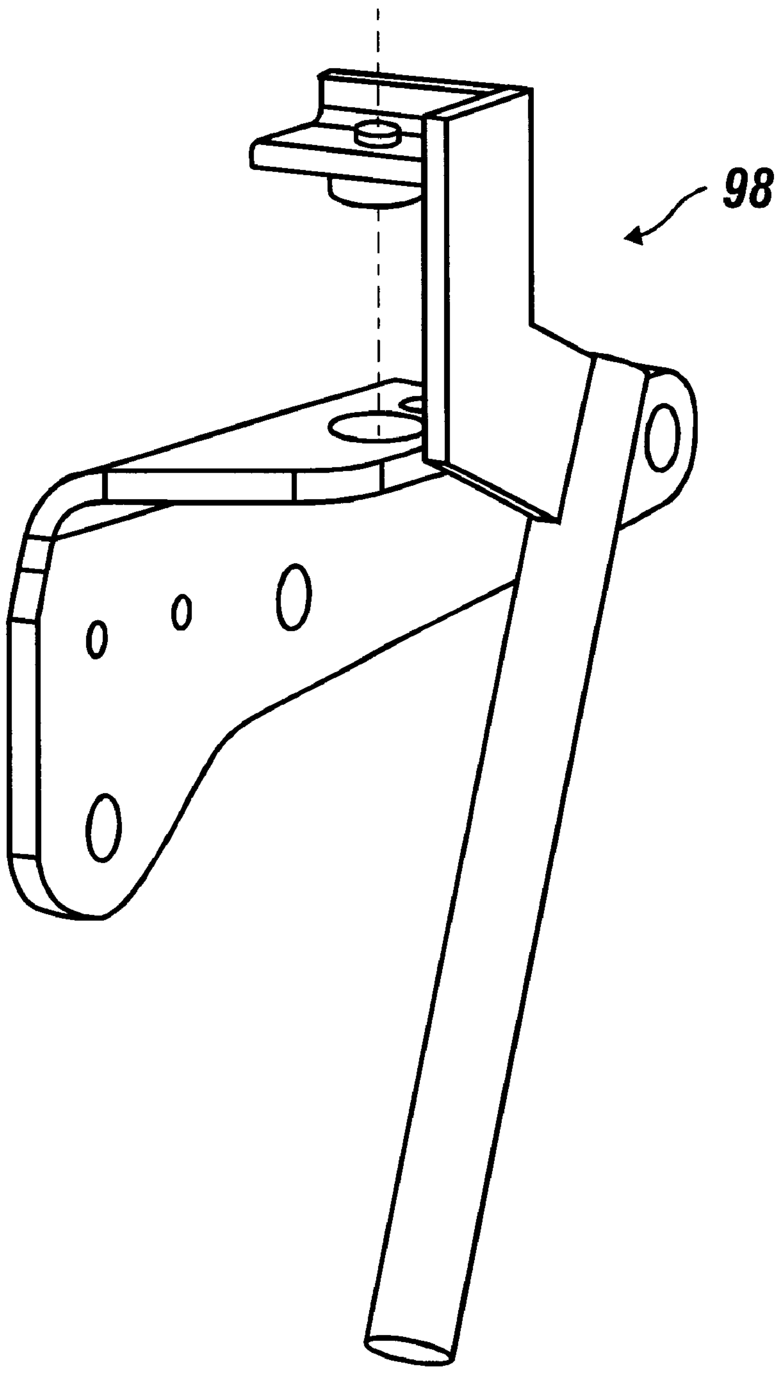
FIG. 9 is a perspective view of a clutch freepedal adjustment tool.
Figure 10:
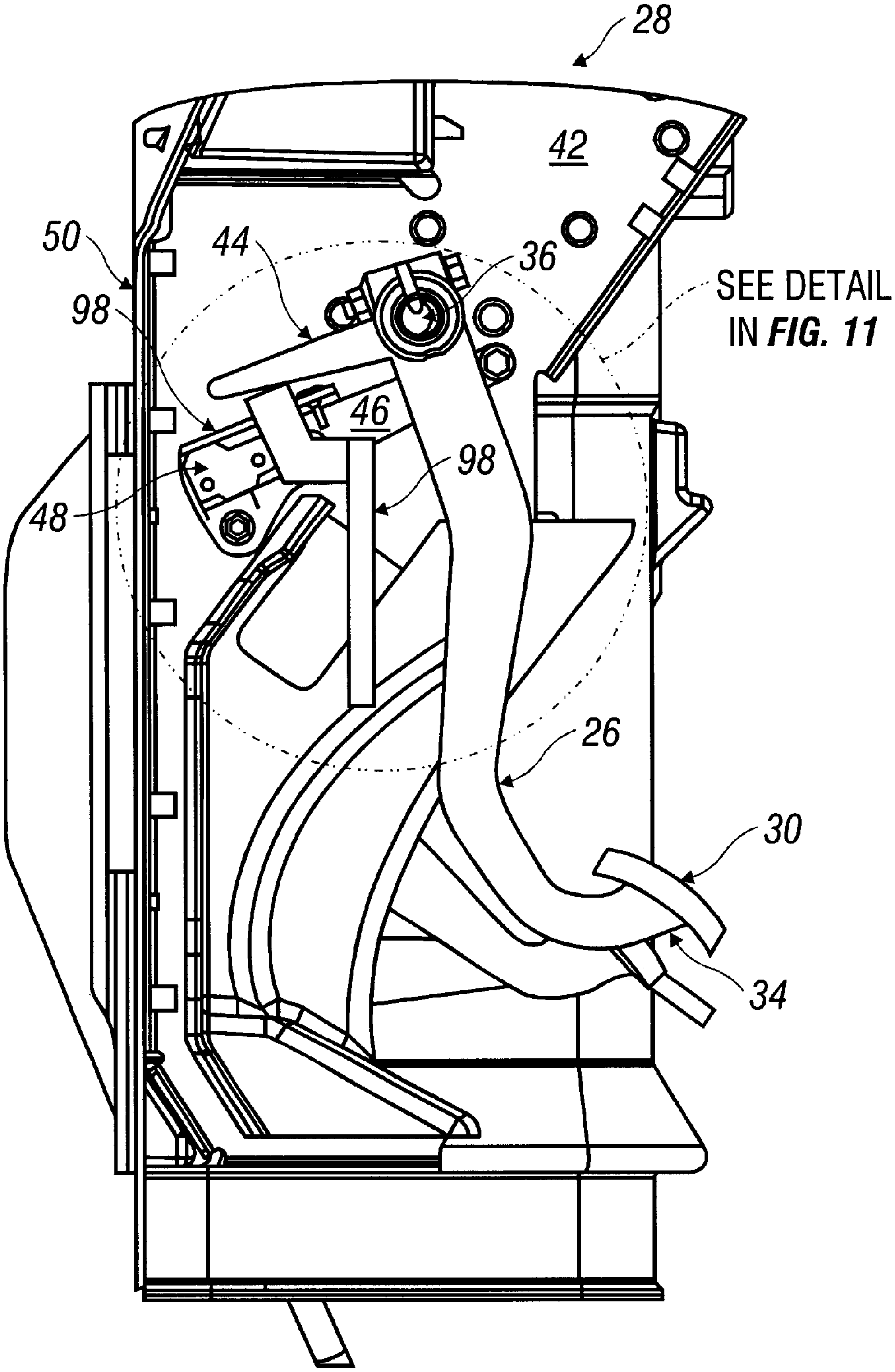
FIG. 10 is a left side view of the clutch actuation system of FIG. 1 having the clutch freepedal adjustment tool inserted therein, with portions of the clutch actuation system and the vehicle broken away for illustration purposes.
Figure 11:
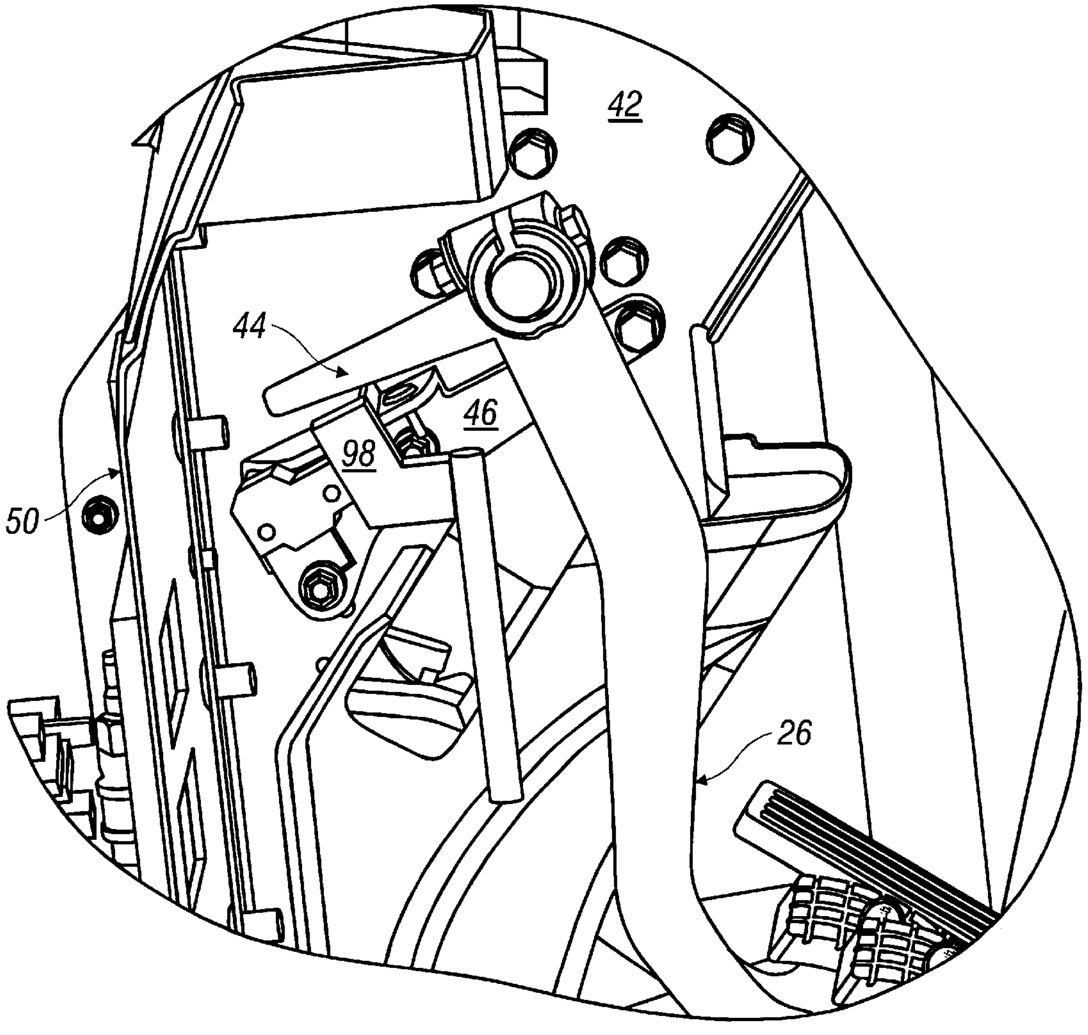
FIG. 11 is an enlarged detailed view of FIG. 10, with more portions of the clutch actuation system and the vehicle broken away for illustration purposes.

According to another aspect of the present invention, a method of adjusting the clutch actuation system 20 of the first embodiment, described above, while installing it on a vehicle is provided. Various aspects of the method steps are illustrated in FIGS. 6–11. The method comprises at least thirteen steps. First, the clevis link 82 is threaded onto the second cable end 80 to a position such that about half of the threads on the second cable end are threaded into the clevis link, as shown in FIG. 7. Second, the clutch stop bracket 46 is installed on the steering column 42 in the cab 28, but the mounting bolts 92 (see FIG. 8) are left loose to allow movement of the clutch stop bracket. Third, a clutch stop adjustment tool 94 is temporarily inserted into the mounting holes 96 (see FIG. 8) for the first bearing member 40 on the steering column 42 within the cab 28. Fourth, as shown in FIG. 8, the clutch stop bracket 46 is slid to a position where it abuts the clutch stop adjustment tool 94. Fifth, the mounting bolts 92 for the clutch stop bracket 46 are tightened while maintaining its position abutted against the clutch stop adjustment tool 94. Sixth, the clutch stop adjustment tool 94 is removed. Seventh, the remainder of the clutch actuation system 20 is installed on the vehicle, except the connection between the first cable end 74 and the clutch pedal lever 64, as well as the attachment of the first cable housing end 70 to the clutch cable firewall bracket 72. Eighth, the clutch pedal 26 is pivoted about the first rotational axis 32 to provide clearance for a clutch freepedal adjustment tool 98 (see FIG. 9), which is inserted on top of the clutch stop bracket 46. Ninth, with the clutch freepedal adjustment tool 98 inserted on top of the clutch stop bracket 46 below the pedal stop 44 as shown in FIGS. 10 and 11, the clutch pedal 26 is released and the clutch return spring 86 biases the clutch pedal such that the pedal stop is abutted against the clutch freepedal adjustment tool. Hence the clutch freepedal adjustment tool 98 is sandwiched between the pedal stop 44 and the clutch stop bracket 46. Tenth, the first cable end 74 is attached to the clutch pedal lever 64 using the eye hole link 76, as seen in FIG. 6. Eleventh, the first cable housing end 70 is attached to the clutch cable firewall bracket 72 using the adjustment nuts 78 while pulling the slack out of the cable 66, as also seen in FIG. 6. Twelfth, pivot the clutch pedal 26 and remove the clutch freepedal adjustment tool 98. Thirteenth, with the clutch freepedal adjustment tool 89 removed, further adjustments to the clutch actuation system 20 can be done by adjusting the eye hole link 76, the adjustment nuts 78, or the clevis link 82. But, most final adjustments in step thirteen can be done merely by adjusting the adjustment nuts 78, which are easily accessible at the firewall 50 in the engine compartment.

It will be appreciated by those skilled in the art having the benefit of this disclosure that this invention provides a clutch actuation system and a method of installing and adjusting the clutch actuation system. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A clutch actuation system of a vehicle for actuating a clutch lever of a clutch system in response to the actuation of a clutch pedal in a vehicle cab, said vehicle cab having a firewall separating an engine compartment of said vehicle from an interior of said vehicle cab, comprising:

a clutch pedal shaft attached to said clutch pedal, said clutch pedal shaft lying on a first axis of rotation, said first rotational axis extending laterally relative to said vehicle cab when said clutch actuation system is operably installed on said vehicle;

a first bearing member pivotably supporting a first shaft end of said clutch pedal shaft such that said shaft can pivot within said first bearing member, said clutch pedal being attached to said shaft proximate to said first bearing member, and said first bearing member being attached to said vehicle cab and being entirely within said vehicle cab when said clutch actuation system is operably installed on said vehicle;

a second bearing member pivotably supporting a second shaft end of said shaft such that said shaft can pivot within said second bearing member, said second bearing member being adapted to attach to said firewall such that said second bearing member has a portion of said second bearing member located on one side of said firewall within said vehicle cab, another portion of said second bearing member is located on the other side of said firewall in said engine compartment, and said second shaft end extends through said second bearing member and through said firewall when said clutch actuation system is operably installed on said vehicle;

a clutch pedal lever attached to said second shaft end such that as said clutch pedal pivots about said first rotational axis, said clutch lever correspondingly pivots about said first rotational axis via said shaft, and said clutch pedal lever being located within said engine compartment when said clutch actuation system is operably installed on said vehicle;

a clutch return spring biasing said clutch pedal;

a clutch cable firewall bracket being adapted to attach to said vehicle within said engine compartment proximate to said clutch pedal lever; and a clutch cable for pulling said clutch lever, said clutch cable having first and second cable ends, at least a portion of said clutch cable being surrounded by a cable housing, said cable housing having first and second cable housing ends, said first cable housing end being attached to said clutch cable firewall bracket, said first cable end being connected to said clutch pedal lever such that said clutch cable moves relative to said cable housing when said clutch pedal lever pivots about said first rotational axis, said second cable end being connected to said clutch lever such that said clutch cable actuates said clutch lever when said clutch pedal lever pivots about said first rotational axis in response to said clutch pedal pivoting about said first rotational axis via said shaft, said clutch cable and cable housing being located entirely outside of said vehicle cab when said clutch actuation system is operably installed on said vehicle.

2. A clutch actuation system in accordance with claim 1, wherein said clutch return spring has a first spring end attached to said clutch pedal lever, said clutch return spring has a second spring end attached to said clutch cable firewall bracket, said clutch return spring biases said clutch pedal via said clutch pedal lever about said shaft, and said clutch return spring being located within said engine compartment when said clutch actuation system is operably installed on said vehicle.

3. A clutch actuation system in accordance with claim 1, wherein said clutch cable firewall bracket attaches to said firewall and is located within said engine compartment when said clutch actuation system is operably installed on said vehicle.

4. A clutch actuation system in accordance with claim 1, wherein said clutch cable is a sealed cable.

5. A clutch actuation system in accordance with claim 4, further comprising:

a lubricating substance located between said clutch cable and said cable housing.

6. A clutch actuation system in accordance with claim 1, further comprising:

a pedal stop attached to said clutch pedal and extending therefrom, said pedal stop being adapted to remain fixed relative to said clutch pedal.

7. A clutch actuation system in accordance with claim 6, further comprising:

a clutch stop bracket adapted to attach to said vehicle within said vehicle cab proximate to said clutch pedal and said first bearing member when said clutch actuation system is operably installed on said vehicle, said clutch stop bracket being adapted to limit the pivoting of said clutch pedal about said first rotational axis when said pedal stop abuts said clutch stop bracket.

8. A clutch actuation system in accordance with claim 7, further comprising:

a clutch switch, said clutch switch being attached to said clutch stop bracket and being adapted to be switched when said pedal stop abuts said clutch stop bracket.

9. A clutch actuation system in accordance with claim 1, further comprising:

at least one cable adjustment nut attaching said first cable housing end to said clutch cable firewall bracket such that said clutch cable can be adjusted at said clutch cable firewall bracket using said at least one cable adjustment nut.

10. A clutch actuation system in accordance with claim 1, further comprising:

an eye hole link connecting said first cable end to said clutch pedal lever.

11. A clutch actuation system in accordance with claim 1, further comprising:

a clevis link connecting said second cable end to said clutch lever.

12. A clutch actuation system in accordance with claim 1, wherein said second cable housing end is attached to said vehicle when said clutch actuation system is operably installed on said vehicle.

13. A clutch actuation system in accordance with claim 1, wherein said clutch pedal has a footpad at a distal end thereof, said footpad being positioned lower than said first rotational axis when said clutch actuation system is operably installed on said vehicle.

14. A clutch actuation system in accordance with claim 1, wherein said clutch pedal lever is substantially perpendicular to said clutch cable when said clutch pedal is midway through an operable pivotal range of said clutch pedal about said first rotational axis and when said clutch actuation system is operably installed on said vehicle.

15. A clutch actuation system of a vehicle for actuating a clutch lever of a clutch system in response to the actuation of a clutch pedal in a vehicle cab, said vehicle cab having a firewall separating an engine compartment of said vehicle from an interior of said vehicle cab, comprising:

a clutch pedal shaft attached to said clutch pedal, said clutch pedal shaft lying on a first axis of rotation;

a first bearing member pivotably supporting a first shaft end of said clutch pedal shaft such that said shaft can pivot within said first bearing member, said clutch pedal being attached to said shaft proximate to said first bearing member, and said first bearing member being attached to said vehicle cab and being entirely within said vehicle cab when said clutch actuation system is operably installed on said vehicle;

a second bearing member pivotably supporting a second shaft end of said shaft such that said shaft can pivot within said second bearing member, said second bearing member being adapted to attach to said firewall such that said second bearing member has a portion of said second bearing member located on one side of said firewall within said vehicle cab, another portion of said second bearing member is located on the other side of said firewall in said engine compartment, and said second shaft end extends through said second bearing member and through said firewall when said clutch actuation system is operably installed on said vehicle;

a clutch pedal lever attached to said second shaft end such that as said clutch pedal pivots about said first rotational axis, said clutch lever correspondingly pivots about said first rotational axis via said shaft, and said clutch pedal lever being located within said engine compartment when said clutch actuation system is operably installed on said vehicle;

a clutch return spring biasing said clutch pedal via said clutch pedal lever and said shaft, said clutch return spring having a first spring end attached to said clutch pedal lever, said clutch return spring being located within said engine compartment when said clutch actuation system is operably installed on said vehicle;

a clutch cable firewall bracket being adapted to attach to said vehicle within said engine compartment proximate to said clutch pedal lever, said clutch return spring having a second spring end attached to said clutch cable firewall bracket; and a clutch cable for pulling said clutch lever, said clutch cable having first and second cable ends, at least a portion of said clutch cable being surrounded by a cable housing, said cable housing having first and second cable housing ends, said first cable housing end being attached to said clutch cable firewall bracket, said first cable end being connected to said clutch pedal lever such that said clutch cable moves relative to said cable housing when said clutch pedal lever pivots about said first rotational axis, said second cable end being connected to said clutch lever such that said clutch cable actuates said clutch lever when said clutch pedal lever pivots about said first rotational axis in response to said clutch pedal pivoting about said first rotational axis via said shaft, said clutch cable and cable housing being located entirely outside of said vehicle cab when said clutch actuation system is operably installed on said vehicle.

16. A clutch actuation system in accordance with claim 15, wherein said first rotational axis extends laterally relative to said vehicle cab when said clutch actuation system is operably installed on said vehicle.

17. A clutch actuation system in accordance with claim 15, wherein said clutch cable firewall bracket attaches to said firewall and is located within said engine compartment when said clutch actuation system is operably installed on said vehicle.

18. A clutch actuation system in accordance with claim 15, wherein said clutch cable is a sealed cable.

19. A clutch actuation system in accordance with claim 18, further comprising:

a lubricating substance located between said clutch cable and said cable housing.

20. A clutch actuation system in accordance with claim 15, further comprising:

a pedal stop attached to said clutch pedal and extending therefrom, said pedal stop being adapted to remain fixed relative to said clutch pedal.

21. A clutch actuation system in accordance with claim 20, further comprising:

a clutch stop bracket adapted to attach to said vehicle within said vehicle cab proximate to said clutch pedal and said first bearing member when said clutch actuation system is operably installed on said vehicle, said clutch stop bracket being adapted to limit the pivoting of said clutch pedal about said first rotational axis when said pedal stop abuts said clutch stop bracket.

22. A clutch actuation system in accordance with claim 21, further comprising:

a clutch switch, said clutch switch being attached to said clutch stop bracket and being adapted to be switched when said pedal stop abuts said clutch stop bracket.

23. A clutch actuation system in accordance with claim 15, further comprising:

at least one cable adjustment nut attaching said first cable housing end to said clutch cable firewall bracket such that said clutch cable can be adjusted at said clutch cable firewall bracket using said at least one cable adjustment nut.

24. A clutch actuation system in accordance with claim 15, further comprising:

an eye hole link connecting said first cable end to said clutch pedal lever.

25. A clutch actuation system in accordance with claim 15, further comprising:

a clevis link connecting said second cable end to said clutch lever.

26. A clutch actuation system in accordance with claim 15, wherein said second cable housing end is attached to said vehicle when said clutch actuation system is operably installed on said vehicle.

27. A clutch actuation system in accordance with claim 15, wherein said clutch pedal has a footpad at a distal end thereof, said footpad being positioned lower than said first rotational axis when said clutch actuation system is operably installed on said vehicle.

28. A clutch actuation system in accordance with claim 15, wherein said clutch pedal lever is substantially perpendicular to said clutch cable when said clutch pedal is midway through an operable pivotal range of said clutch pedal about said first rotational axis and when said clutch actuation system is operably installed on said vehicle.

* * * * *